(12) United States Patent
Joheb et al.

(10) Patent No.: US 11,470,143 B2
(45) Date of Patent: Oct. 11, 2022

(54) SYSTEMS AND METHODS FOR REAL-TIME TRANSFER FAILURE DETECTION AND NOTIFICATION

(71) Applicant: The Toronto-Dominion Bank, Toronto (CA)

(72) Inventors: Asad Joheb, Toronto (CA); Mohit Sharma, Toronto (CA); Madeline Redmond, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 47 days.

(21) Appl. No.: 16/750,404

(22) Filed: Jan. 23, 2020

(65) Prior Publication Data

US 2021/0234917 A1    Jul. 29, 2021

(51) Int. Cl.
*H04L 67/06* (2022.01)
*H04L 67/1095* (2022.01)
*G06F 16/27* (2019.01)

(52) U.S. Cl.
CPC .............. *H04L 67/06* (2013.01); *G06F 16/27* (2019.01); *H04L 67/1095* (2013.01)

(58) Field of Classification Search
CPC ...... H04L 67/06; H04L 67/1095; G06F 16/27
USPC ......................................................... 709/219
See application file for complete search history.

(56) References Cited

U.S. PATENT DOCUMENTS

| | | |
|---|---|---|
| 5,668,993 A | 9/1997 | Peters et al. |
| 6,330,546 B1 | 12/2001 | Gopinathan et al. |
| 6,458,069 B1 | 10/2002 | Tam et al. |
| 6,714,918 B2 | 3/2004 | Deshpande et al. |
| 7,117,172 B1 | 10/2006 | Black |
| 7,389,256 B1 * | 6/2008 | Adams .................... G06Q 20/02 705/35 |
| 7,668,769 B2 | 2/2010 | Baker et al. |

(Continued)

FOREIGN PATENT DOCUMENTS

WO    2019074846    4/2019

OTHER PUBLICATIONS

Mielina Gouveia, Oracle Releases Autonomous Transaction Processing Solution; Located via Google: https://which-50.com/oracle-releases-autonomous-transaction-processing-solution/ Aug. 9, 2018.

(Continued)

*Primary Examiner* — Kevin S Mai
(74) *Attorney, Agent, or Firm* — Rowand LLP

(57) ABSTRACT

Methods and computer systems for processing bulk transfer files are described. In an aspect, a transfer processing system is configured for: receiving a bulk transfer file from a remote device, the bulk transfer file defining a plurality of requested transfers associated with a database; classifying one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing; and providing, in real time or near real time, a notification to the remote device of the requested transfers identified as likely to fail processing.

19 Claims, 10 Drawing Sheets

(56) References Cited

U.S. PATENT DOCUMENTS

| | | | |
|---|---|---|---|
| 7,962,382 B1 | 6/2011 | Tancredi et al. | |
| 8,032,448 B2 | 10/2011 | Anderson et al. | |
| 8,543,522 B2 | 9/2013 | Ryman-Tubb et al. | |
| 8,725,613 B1 | 5/2014 | Celka et al. | |
| 8,812,351 B2 | 8/2014 | Zollino et al. | |
| 9,269,095 B1 | 2/2016 | Chan et al. | |
| 9,336,494 B1 | 5/2016 | Purpura et al. | |
| 9,626,679 B2 | 4/2017 | Bhorania et al. | |
| 10,134,040 B2 | 11/2018 | Ding et al. | |
| 2010/0005013 A1 | 1/2010 | Uriarte | |
| 2011/0239044 A1 | 9/2011 | Kumar et al. | |
| 2014/0195396 A1* | 7/2014 | Bhakta | G06Q 40/02 705/35 |
| 2016/0086177 A1* | 3/2016 | Billings | G06Q 40/02 705/40 |
| 2016/0127319 A1 | 5/2016 | Xiong et al. | |
| 2017/0330099 A1* | 11/2017 | de Vial | G06F 11/0721 |
| 2018/0218369 A1 | 8/2018 | Xiao et al. | |
| 2019/0108456 A1 | 4/2019 | Adjaoute | |
| 2019/0377611 A1* | 12/2019 | Khan | G06Q 10/06315 |
| 2020/0184487 A1* | 6/2020 | Pandya | H04L 63/1441 |

OTHER PUBLICATIONS

K. Anupriya; R. Gayathri; M. Balaanand; C.B. Sivaparthipan; Eshopping Scam Identification using Machine Learning; Located via IEEE: https://ieeexplore.ieee.org/abstract/document/8573687 Feb. 14, 2018.

\* cited by examiner http://www.Firstbank.com/batchtransferprocessing.html — 1002

Select file to upload: C:/bulktransfers/payroll12232019.csv — 1004

Upload File — 1006

⚠ WARNING — 1108
There appear to be errors in your file.
Below is a list of possible errors. Please review and correct if needed

1212

| Please Check | Recipient Account No. | Bank Country Code | Bank Identifier |
|---|---|---|---|
| Account should be 9 digits | 45327890345 | CA | 123 |
| Account has ! | 234970678! | US | 125 |
| Account has hyphen | 58906-567 | CA | 123 |
| Recipient and account | 78987679 | US | 125 |

Send Updates — 1214

FIG. 12

SYSTEMS AND METHODS FOR REAL-TIME TRANSFER FAILURE DETECTION AND NOTIFICATION

FIELD

This relates to electronic data transfer systems and, more particularly, to systems and methods for detecting data errors in batch data transfer configuration files at the time of upload of such files to a processing server.

BACKGROUND

Large companies often configure data transfers, such as payments, en masse. For example, large companies often prepare a batch data transfer configuration file (which may also be referred to as a batch transfer file) that lists numerous payments that are to be made to various accounts. Such files may detail hundreds and, in some cases, thousands of payments in a single file. The company may send the batch data transfer configuration file to a data transfer configuration server, such as a payment processing server. The data transfers identified in the data transfer configuration file are then processed sometime later. In some instances, the data transfers that are identified in a file may fail processing. That is, the payment processor may attempt to perform the data transfer but the data transfer may fail. Often, it may take many hours or, in some cases, days to detect transfer failures since the processing of payments is typically not completed immediately. For example, in some instances, processing may be delayed because one or more of the payments are post-dated payments (i.e., set to occur on a later date). By way of further example, in some instances, processing may be delayed because the payments may be processed sometime later as part of a batch process. By way of further example, processing may be delayed because the payments may need to wait for other payments in a processing queue to be processed. By way of further example, a delay may be caused by a delayed response from a third party required to process such payments.

Whatever its source, the delay in detecting processing failures may cause any one of a number of different issues. For example, a payment that is required to be completed on a particular date may not be completed on that date.

BRIEF DESCRIPTION OF THE DRAWINGS

Embodiments are described in detail below, with reference to the following drawings:

FIG. 12 is a further example upload interface having a notification.

Like reference numerals are used in the drawings to denote like elements and features.

DETAILED DESCRIPTION OF EXAMPLE EMBODIMENTS

Figure 1:
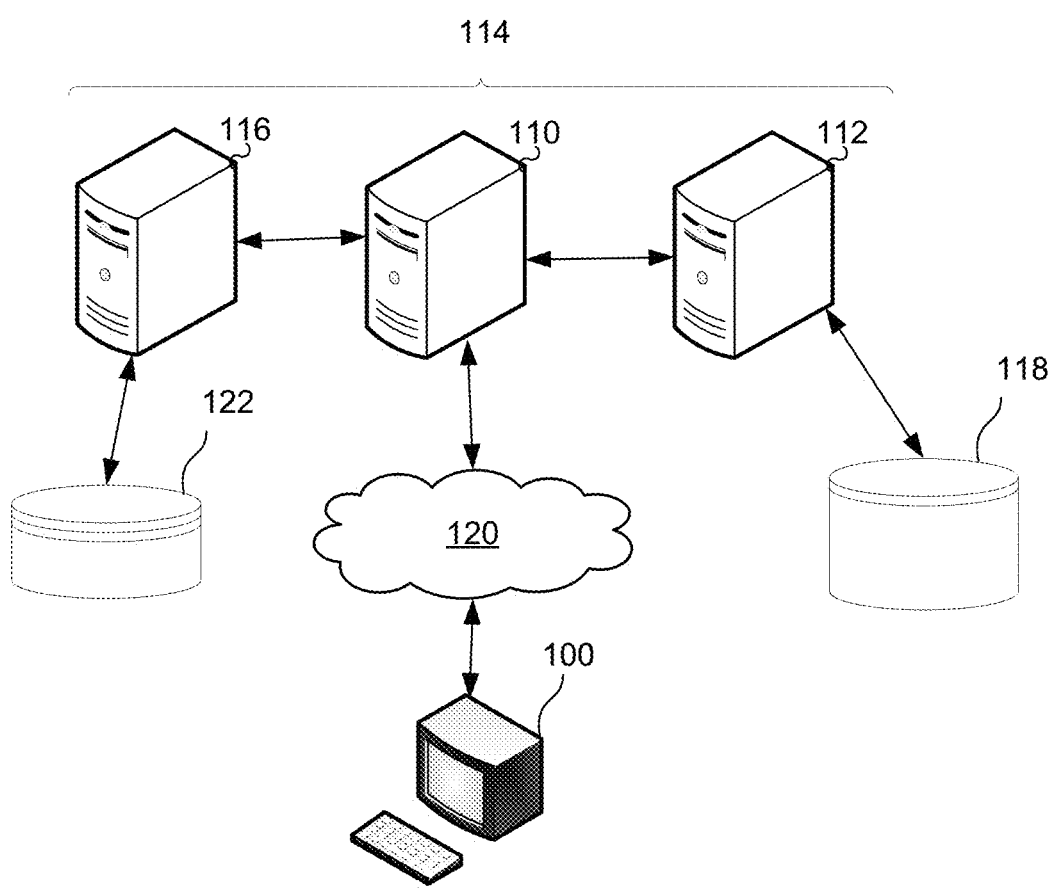
FIG. 1 is a schematic operation diagram illustrating an operating environment of an example embodiment according to the subject matter of the present application.

According to the subject matter of the present application there may be provided a computer system, which may be a transfer processing system. The computer system may include a communications module and a processor coupled to the communications module. The computer system may include a memory coupled to the processor and storing instructions that, when executed by the processor, cause the computer system to: receive, using the communications module and from a remote device via an upload interface displayed on the remote device, a bulk transfer file, the bulk transfer file defining a plurality of requested transfers associated with a database; classify one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing; and provide, in real time or near real time via the communications module, a notification to the remote device of the requested transfers identified as likely to fail processing.

Conveniently, in this way, a notification of a possible transfer failure may be provided in real-time or at least near real-time during upload of a bulk transfer file. Notably, this may allow transfers that are identified as being likely to fail processing to be corrected before such transfers are sent for processing/execution. In many cases, the correction may be made prior to the processing of other transfers in the bulk transfer file so that there is no delay in processing the corrected transfers. For example, by providing real-time feedback in the upload module itself, corrections may be made immediately, thereby avoiding delays.

The term "real-time," "near real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs.

In some implementations, the instructions may further cause the transfer processing system to train the classifier to identify transfers likely to fail processing using the training data.

In some implementations, the instructions may further cause the transfer processing system to: after classifying, prepare a filtered listing of transfers, the filtered listing of transfers including the plurality of requested transfers not identified as likely to fail processing and excluding any of the plurality of requested transfers identified as likely to fail processing; and perform a batch processing operation on the filtered listing of transfers to complete the transfers identified in the filtered listing of transfers.

In some implementations, the classifier may be configured to classify based on one or more of the following features: recipient account number format; recipient account number length; recipient account number; recipient jurisdiction; and recipient bank identifier.

In some implementations, the transfers may represent payments.

In some implementations, the training data may mark at least some of the past requested transfers with corrected data. The corrected data may indicate a correction made to such transfers for successful processing. The classifier may be trained to determine a suggested correction for a transfer identified as likely to fail processing. The notification may include the determined suggested correction.

In some implementations, the notification may include a selectable option to accept the suggested correction. The instructions may further cause the transfer processing system to: receive an indication of a selection of the selectable option via the communications module; and in response to receiving the indication of selection of the selectable option, process the transfer identified as a possible transfer failure using the suggested correction.

In some implementations, processing the transfer identified as a possible transfer failure using the suggested correction may include updating the bulk transfer file based on the suggested correction.

In some implementations, the upload interface may be provided in a web interface and wherein the notification is provided in the web interface.

In some implementations, the instructions may further cause the transfer processing system to: receive an indication from the remote device and via the communications module that a transfer identified as likely to fail processing is believed to be correct; process the transfer associated with the indication; and upon determining that the transfer associated with the indication has successfully completed processing, add the transfer to further training data used to re-train the classifier, the further training data indicating that the transfer has completed processing, the further training data including only erroneously classified transfers.

According to the subject matter of the present application, there may be provided a computer-implemented method. The method may include: receiving a bulk transfer file from a remote device, the bulk transfer file defining a plurality of requested transfers associated with a database; classifying one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing; and providing, in real time or near real time, a notification to the remote device of the requested transfers identified as likely to fail processing.

In at least some implementations, the method may further include training the classifier to identify transfers likely to fail processing using the training data.

In at least some implementations, the method may further include: after classifying, preparing a filtered listing of transfers, the filtered listing of transfers including the plurality of requested transfers not identified as likely to fail processing and excluding any of the plurality of requested transfers identified as likely to fail processing; and performing a batch processing operation on the filtered listing of transfers to complete the transfers identified in the filtered listing of transfers.

In at least some implementations, the classifier may be configured to classify based on one or more of the following features: recipient account number format; recipient account number length; recipient account number; recipient jurisdiction; and recipient bank identifier.

In at least some implementations, the transfers represent payments.

In at least some implementations, the training data marks at least some of the past requested transfers with corrected data. The corrected data may indicate a correction made to such transfers for successful processing and wherein the classifier is trained to determine a suggested correction for a transfer identified as likely to fail processing. The notification may include the determined suggested correction.

In at least some implementations, the notification may include a selectable option to accept the suggested correction. The method may further include: receiving an indication of a selection of the selectable option; and in response to receiving the indication of selection of the selectable option, processing the transfer identified as a possible transfer failure using the suggested correction.

In at least some implementations, processing the transfer identified as a possible transfer failure using the suggested correction may include updating the bulk transfer file based on the suggested correction.

In at least some implementations, the bulk transfer file may be received via an upload interface. The upload interface may be provided in a web interface. The notification may be provided in the web interface.

In at least some implementations, the method may further include: receiving an indication from the remote device and via the communications module that a transfer identified as likely to fail processing is believed to be correct; processing the transfer associated with the indication; and upon determining that the transfer associated with the indication has successfully completed processing, adding the transfer to further training data used to re-train the classifier, the further training data indicating that the transfer has completed processing, the further training data including only erroneously classified transfers.

In some implementations, there may be provided a computer-readable storage medium. The computer-readable storage medium may be a non-transitory computer-readable storage medium. The computer-readable storage medium may store instructions which, when executed by a processor of a computer system, cause the computer system to perform a method described herein. For example, in an implementation, the instructions may cause the processor of a computer system to: receive a bulk transfer file from a remote device, the bulk transfer file defining a plurality of requested transfers associated with a database; classify one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing; and provide, in real time or near real time, a notification to the remote device of the requested transfers identified as likely to fail processing.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the terms "a processor" or "the processor" may include multiple processors which may act in cooperation.

Example embodiments of the present application are not limited to any particular operating system, system architecture, mobile device architecture, server architecture, or computer programming language.

FIG. 1 is a schematic operation diagram illustrating an operating environment of an example embodiment.

As illustrated, a remote device 100 is in communication with a transfer processing system 114 via a network 120. The remote device 100 is geographically remote from transfer processing system 114 and vice-versa. The transfer processing system 114 may be operating by or otherwise associated with a financial institution, such as a bank, and the remote device 100 may be operated by or otherwise associated with a customer of the financial institution. The customer may be a corporate/business customer.

The transfer processing system 114 is a computer system and, in the example illustrated, is comprised of a number of computing systems that act together to provide the functions of the transfer processing system 114. For example, the transfer processing system 114 may include a server 110, a classifier 112 and/or a processing system 116, which may act as a database interface for a database 122 such as a bank account database. The server 110 provides a front-end interface for the transfer processing system 114 which allows the transfer processing system to interact with the remote device 100. For example, the server 110 may provide one or more graphical user interfaces (GUIs) to the remote device 100. By way of example, the server 110 may provide, to the remote device 100, an upload interface. The upload interface is an interface for configuring a transfer of a bulk transfer file from the remote device 100 to the transfer processing system 114. That is, the upload interface, when displayed on the remote device 100, provides a selectable option to upload a bulk transfer file to the transfer processing system 114 via the network 120.

A bulk transfer file is a file detailing a plurality of transfers of value that are to be made from an account associated with the remote device 100. The account is an account in a database 122. The account may be or represent a bank account and the database may be a database of bank accounts at a particular financial institution. The bulk transfer file may include data in the form of rows and columns. In some implementations, each column represents a different type of data and each row represents a different transfer. For example, one column may include account number data and another column may include a recipient bank identifier. In other implementations, the roles of columns and rows may be the reverse—columns may represent transfers and rows may represent data types.

The bulk transfer file may be, for example, a spreadsheet file. In some implementations, the bulk transfer file may be in a delimited file format. Put differently, the bulk transfer file may include delimiter-separated values (DSV) such as, for example, comma separated values (CSV) or tab separated values (TSV). Other delimiters, such as the vertical bar or pipe, space, etc. may also be used. In some implementations, the bulk transfer file may be an XML-based spreadsheet file. Other spreadsheet file types may be used apart from those noted above.

The bulk transfer file defines a plurality of requested transfers. Particulars of such transfers defined in the bulk transfer file may include, for example, one or more of: a recipient account number, a recipient jurisdiction identifier, a recipient bank identifier, a business identifier code (BIC) such as a SWIFT code, an International Bank Account Number (IBAN), intermediary bank information, routing information, a recipient name, an amount of value which may be expressed, for example, in a particular currency, a currency identifier, and/or other information. The bulk transfer file generally includes, for each transfer, a value identifier indicating what is being transferred (such as an amount of value) and destination identifiers identifying where the value is to be transferred. The destination identifier may, for example, identify a database and an associated record in the database. The database may be, for some transfers, the database 122 associated with the transfer processing system and the record may be another account in the database 122. For example, some transfers may attempt to transfer value between accounts at the financial institution operating the transfer processing system. The destination identifier may, for some transfers in the bulk transfer file, identify an external third party database and a record in that external third party database. For example, some transfers may attempt to transfer value to an account at another financial institution.

The server 110 operates to provide an interface to the remote device 100 which allows the transfer processing system 114 to receive the bulk transfer file from a remote device 100. The transfer processing system 114 may include or be associated with other components, apart from the server 110. For example, in the example illustrated, the transfer processing system 114 includes a classifier 112. The classifier 112 may be a machine learning classifier which may be used to approximately map input variables to discrete output variables. The classifier 112 may be a binary classifier. For example, the classifier 112 may be configured to classify transfers represented in the bulk transfer file as either likely to fail processing or likely to pass processing. The likelihood may be represented as a score or percentage and a threshold may be used to allow the transfer processing system 114 to determine, based on the score or percentage, whether a given transfer is likely to pass or fail processing.

Passing processing may be said to occur when the transfer is able to be completed such that the value identified by the transfer is successfully transferred from a source account to a destination account. Transfers may fail due to any one of a number of reasons including, for example, missing information (e.g., a missing digit in an account number or other identifier), erroneous information (e.g., an alphabetic character in an account number that is supposed to include only numbers). Since transfers may occur to numerous external databases (i.e., the set of banks that may receive a transfer are numerous), predicting failures using a rule-based approach may be difficult. For example, different financial institutions may have different account identifier requirements and tracking variations among all financial institutions may be difficult or impossible if a rule-based approach were taken. However, a suitably trained classifier may be able to instantly identify numerous errors in transfers defined in a bulk transfer file. When the classifier identifies a transfer in the bulk transfer file that is likely to fail processing, the server 110 may provide a notification to the remote device of the transfer(s) that are identified as likely to fail processing. Such a notification may be provided by updating the interface displayed on the remote device 100 to include the notification. Conveniently, the notification may be provided in real time or near real time. For example, the notification may be displayed immediately after an interface element triggering the upload of the bulk data file to the transfer processing system 114 is selected.

The classifier 112 is trained based on training data 118. The training data may take various forms, but it generally includes transfers that are marked as being either successfully processed or marked as having failed processing. Each transfer may include particulars of the same types as those noted above for the transfers in the bulk transfer file. For example, particulars of such transfers may include one or more of: a recipient account number, a recipient jurisdiction identifier, a recipient bank identifier, a business identifier code (BIC) such as a SWIFT code, an International Bank Account Number (IBAN), intermediary bank information, routing information, a recipient name, an amount of value which may be expressed, for example, in a particular currency, a currency identifier, and/or other information.

In at least some implementations, the classifier 112 is a Bayesian classifier.

The training data 118 may be automatically prepared by the transfer processing system in at least some implementations. For example, the transfer processing system 114 may, after processing a transfer using a processing system 116, mark the transfer as being either successfully completed or not successfully completed based on the result of the processing. For example, when processing fails for some reason, it may mark the transfer as being unsuccessful.

In some implementations, the training data may be marked with corrected data. The corrected data indicates a correction made to a transfer that initially failed processing to obtain successful processing for that transfer. The corrected data may be used, for example, to train the classifier to suggest corrections. That is, the corrected data may be used to allow the classifier to suggest how a transfer identified as being likely to fail processing may be modified in order to pass processing.

The transfer processing system 114 includes a processing system 116 which is configured to process transfers such as transfers identified in the bulk transfer file. By way of example, the processing system 116 may be configured to perform internal transfers by transferring value between two different records in the database 122 (i.e., between two accounts at the same financial institution) and/or to perform external transfers by interacting with third party systems (not shown). For example, external transfers may be performed using various transfer methods or protocols. In some implementations, at least some transfers may be performed by interacting with other financial institution systems via a SWIFT (Society for Worldwide Interbank Financial Telecommunication) network. Some transfers may be processed successfully, meaning that value/resources may be successfully transferred from a source account to a recipient account. Other transfers may, however, fail. The processing system 116 tracks transfer status and may, for example, receive notifications of failures based on replies from third party systems.

The processing system 116 may perform bulk processing of transfers. Put another way, the processing system 116 may process a number of transfers as part of a batch processing operation in which a number of transfers (which may be transfers in the same bulk transfer file) are processed simultaneously, consecutively or near simultaneously. Since some transfers may rely on interactions with third party systems, when the processing system 116 processes transfers, failures may not be detected by the processing system 116 immediately. However, as described herein, the classifier 112 may be used to provide more immediacy in notifications of transfers that will likely fail processing.

The transfer processing system 114 may be configured to perform any one of a number of operations in addition to those described above. By way of example, the transfer processing system 114 and, more particularly, the server 110, may be configured to authenticate the remote device 100 as being associated with a particular account. More particularly, the server 110 may authenticate the remote device 100 as being associated with an account in the database 122 from which value is to be debited in processing a transfer before completing such a transfer. Authentication may be performed based on one or more credential such as, for example, a password, username, PIN, fingerprint, etc.

The remote device 100 is a customer computing device. It may, as illustrated, be a desktop computer. However, the remote device 100 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The transfer processing system 114 is or includes a computer system such as a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 120 is a computer network. The network 120 may be an internetwork such as may be formed of one or more interconnected computer networks. For example, such a network may be or may include an Ethernet network, an asynchronous transfer mode (ATM) network, a wireless network, or the like. In some implementations, the network 120 may be the Internet.

As further described below, the remote device 100 may be configured with software to allow it to perform functions described herein. As further described below, the transfer processing system 114 including any one or more of the processing system 116, server 110, and/or classifier 112 may be configured with software to perform associated functions such as those described herein.

FIG. 1 illustrates the processing system 116, the server 110 and the classifier 112 as separate computing devices. However, these systems may not be separate physical systems. For example, two or more of the processing system 116, the server 110 and/or the classifier 112 may be implemented on a common physical device. For example, two or more of the processing system 116, the server 110 and the classifier 112 may be implemented in software associated with a common processor.

Figure 2:
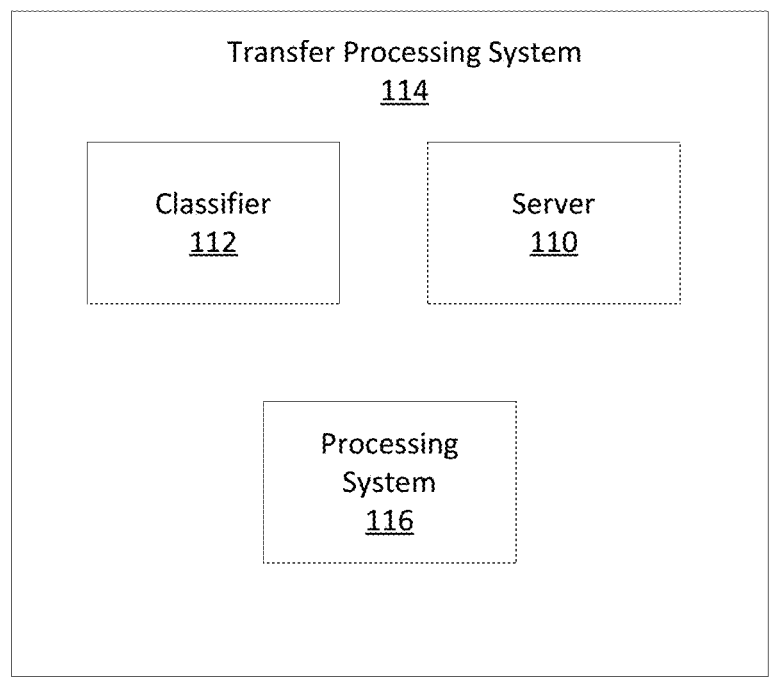
FIG. 2 is a block diagram of an example transfer processing system in accordance with example embodiments of the present application.

Referring to FIG. 2, an example transfer processing system 114 is illustrated. In the example illustrated, the processing system 116, the server 110 and the classifier 112 are implemented as separate software modules on a common device. Accordingly, each of the server 110, classifier 112 and/or processing system 116 may be implemented as separate systems or as on a common system as others of the server 110, classifier 112 and/or processing system 116.

Figure 3:
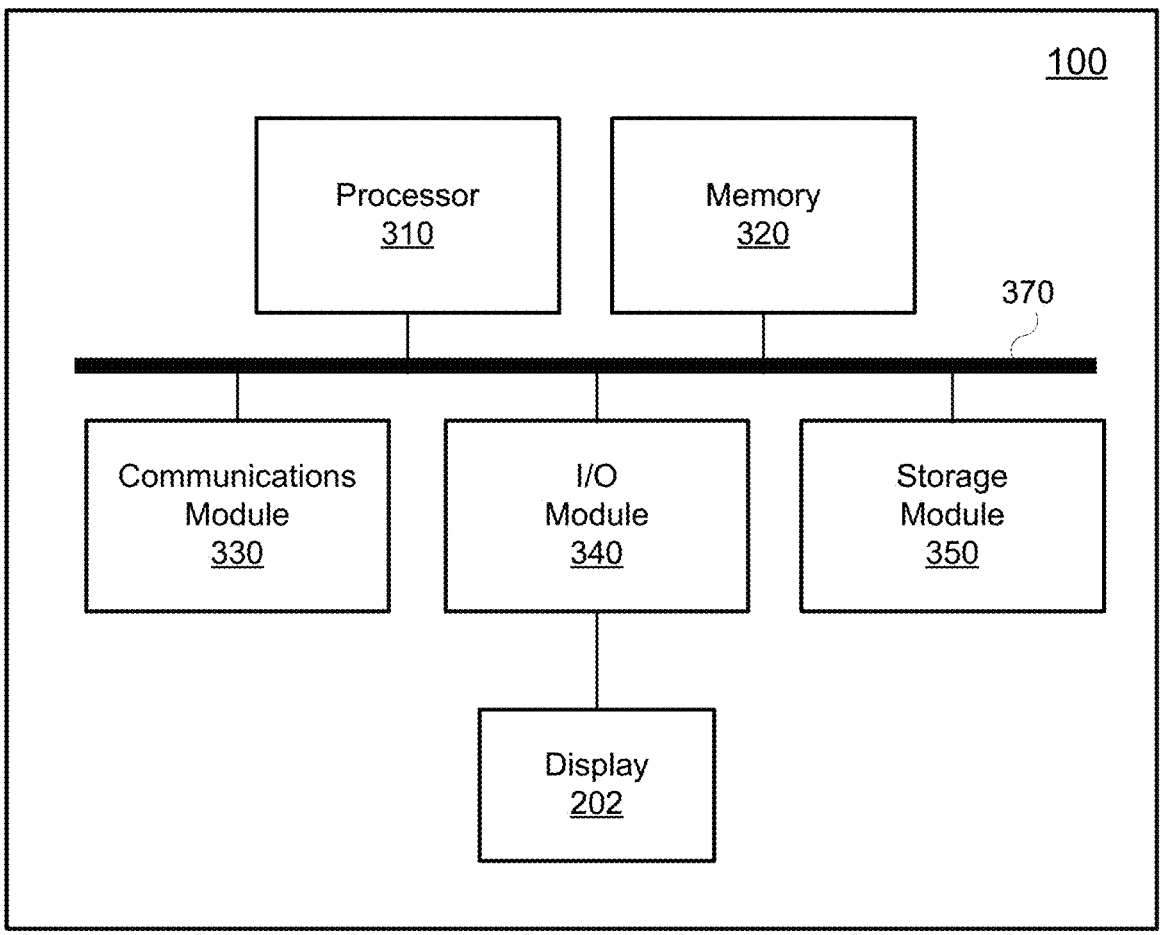
FIG. 3 shows a high-level schematic diagram of the remote device of FIG. 1.

An example embodiment of the remote device 100 will now be discussed with reference to FIG. 3. FIG. 3 is a high-level schematic diagram of the remote device 100. The remote device 100 may, in some embodiments, be a personal computer as shown in FIG. 1.

The remote device 100 includes a variety of modules. For example, as illustrated, the remote device 100 may include a processor 310, a memory 320, a communications module 330, an I/O module 340, and/or a storage module 350. As illustrated, the foregoing example modules of the remote device 100 are in communication over a bus 370. As such, the bus 370 may be considered to couple the various modules of the remote device 100 to each other, including, for example, to the processor 310.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the remote device 100.

The communications module 330 allows the remote device 100 to communicate with other computing devices and/or various communications networks such as, for example, the network 120. For example, the communications module 330 may allow the remote device 100 to send or receive communications signals. Communications signals may be sent or received according to one or more protocols or according to one or more standards. The communications module 330 may allow the remote device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the remote device 100 to communicate using near-field communication (NFC), via Wi-Fi™, using Bluetooth™ or via some combination of one or more networks or protocols. In some embodiments, all or a portion of the communications module 330 may be integrated into a component of the remote device 100. For example, the communications module 330 may be integrated into a communications chipset.

The I/O module 340 is an input/output module. The I/O module 340 allows the remote device 100 to receive input from and/or to provide input to components of the remote device 100 such as, for example, various input modules and output modules. For example, the I/O module 340 may, as shown, allow the remote device 100 to receive input from and/or provide output to the display 202.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

The remote device may include or be connected to a display 202. The display 202 is a module of the remote device 100. The display 202 is for presenting graphics. The display 202 may be, for example, a liquid crystal display (LCD). In addition to being an output device, the display 202 may also be an input device. For example, the display 202 may allow touch input to be provided to the remote device 100. In other words, the display 202 may be a touch sensitive display module. In a particular example, the display 202 may be a capacitive touch screen.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
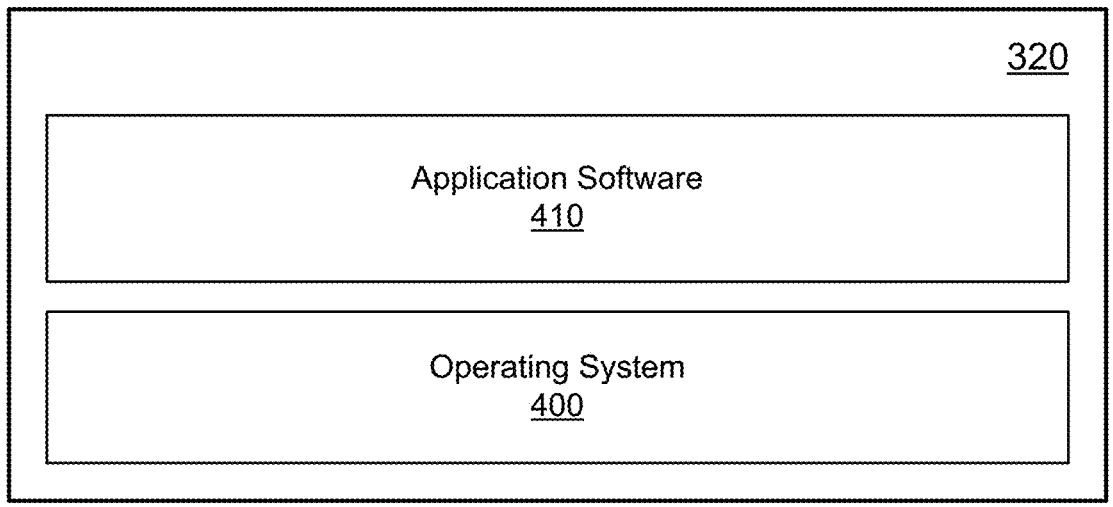
FIG. 4 shows a simplified organization of software components stored in a memory of the remote device of FIG. 3.

FIG. 4 depicts a simplified organization of software components stored in the memory 320 of the remote device 100. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the remote device 100. The operating system 400 may be, for example, Google™ Android™, Apple™ iOS™, UNIX™, Linux™, Microsoft™ Windows™, Apple OSX™ or the like.

The application software 410 adapts the remote device 100, in combination with the operating system 400, to operate as a device for configuring and uploading a bulk transfer file.

As noted above, the transfer processing system 114 is or includes a computer system. An example computer system 500 will now be discussed with reference to FIGS. 5 and 6. Suitably-configured instances of the example computer system 500 may, in some embodiments, serve as and/or be a part of the transfer processing system 114 including, for example, as the classifier 112, the server 110 and/or the processing system 116.

Figure 5:
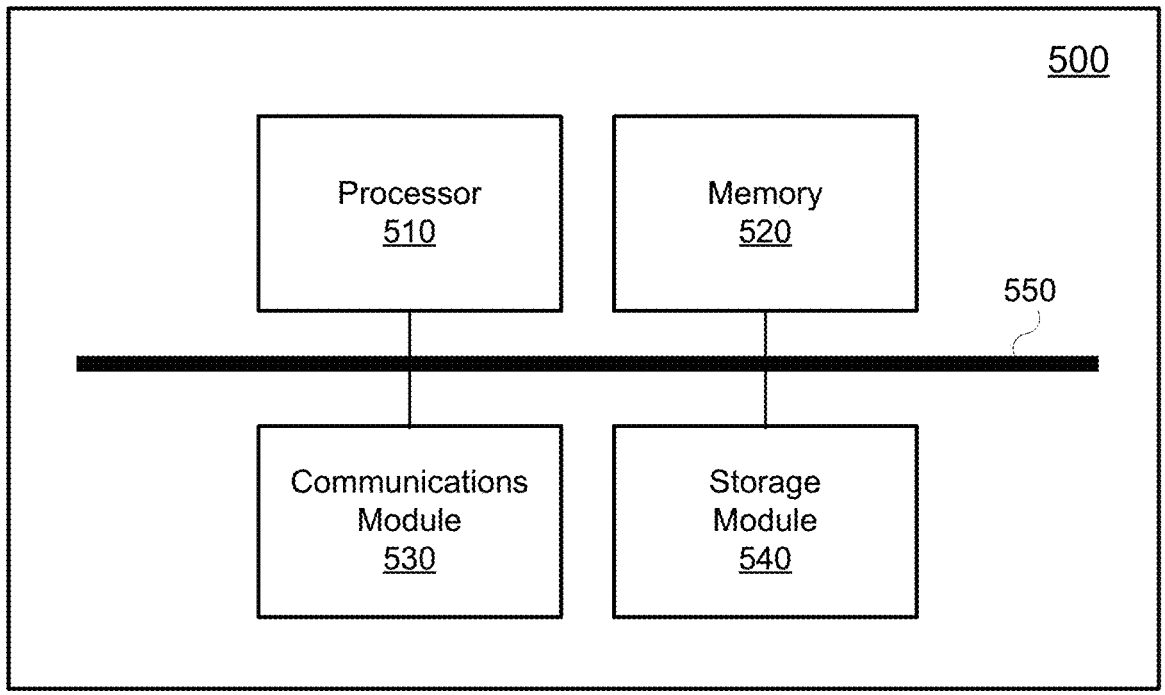
FIG. 5 is high-level schematic diagram of an example transfer processing system.

FIG. 5 is a high-level schematic diagram of an example computer system 500.

The example computer system 500 includes a variety of modules. For example, as illustrated, the example computer system 500 may include a processor 510, a memory 520, a communications module 530, and/or a storage module 540. As illustrated, the foregoing example modules of the example computer system 500 are in communication over a bus 550. As such, the bus 550 may be considered to couple the various modules of the example computer system 500 to each other, including, for example, to the processor 510.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 500.

The communications module 530 allows the example computer system 500 to communicate with other computing devices and/or various communications networks such as, for example, the network 120. The communications module 530 may allow the example computer system 500 to send or receive communications signals. Communications signals may be sent or received according to one or more protocols or according to one or more standards. For example, the communications module 530 may allow the example computer system 500 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 530 may allow the example computer system 500 to communicate via Wi-Fi™, using Bluetooth™ or via some combination of one or more networks or protocols. In some embodiments, all or a portion of the communications module 530 may be integrated into a component of the example computer system 500. For example, the communications module may be integrated into a communications chipset.

The storage module 540 allows the example computer system 500 to store and retrieve data. In some embodiments, the storage module 540 may be formed as a part of the memory 520 and/or may be used to access all or a portion of the memory 520. Additionally or alternatively, the storage module 540 may be used to store and retrieve data from persisted storage other than the persisted storage (if any) accessible via the memory 520. In some embodiments, the storage module 540 may be used to store and retrieve data in a database. A database may be stored in persisted storage. Additionally or alternatively, the storage module 540 may access data stored remotely such as, for example, as may be accessed using a local area network (LAN), wide area network (WAN), personal area network (PAN), and/or a storage area network (SAN). In some embodiments, the storage module 540 may access data stored remotely using the communications module 530. In some embodiments, the storage module 540 may be omitted and its function may be performed by the memory 520 and/or by the processor 510 in concert with the communications module 530 such as, for example, if data is stored remotely.

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

Figure 6:
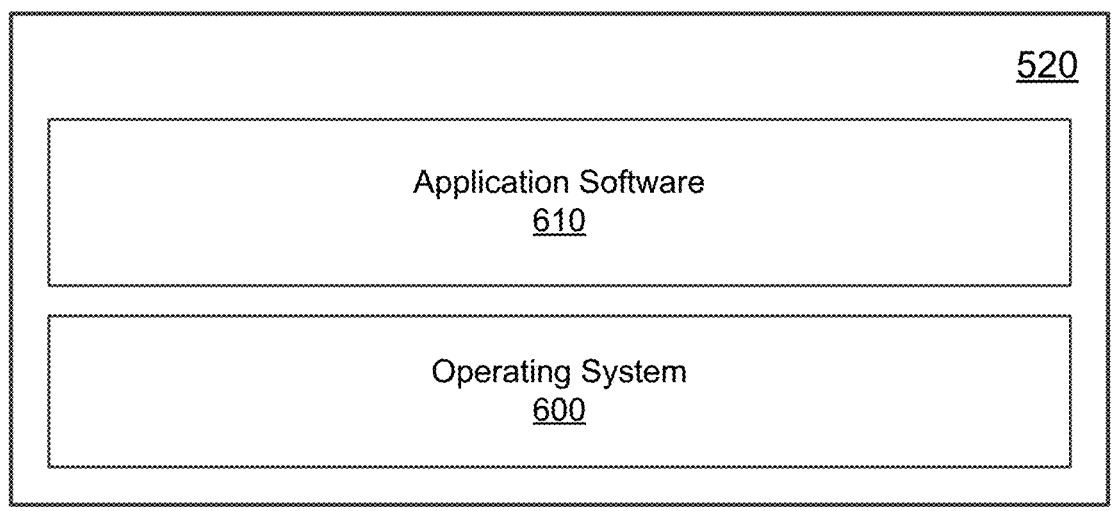
FIG. 6 shows a simplified organization of software components stored in the example transfer processing system of FIG. 5.

FIG. 6 depicts a simplified organization of software components stored in the memory 520 of the example computer system 500. As illustrated, these software components include an operating system 600 and an application software 610.

The operating system 600 is software. The operating system 600 allows the application software 610 to access the processor 510, the memory 520, the communications module 530, and the storage module 540 of the example computer system 500. The operating system 600 may be, for example, UNIX™, Linux™, Microsoft™ Windows™, Apple OSX™ or the like.

The application software 610, when executed, co-operates with the operating system 600 to adapt the example computer system 500 for some purpose and to provide some defined functionality. For example, the application software 610 may cooperate with the operating system 600 to adapt a suitable embodiment of the example computer system 500 to serve as the transfer processing system 114 and/or as one or more of the classifier 112, server 110 and processing system 116.

Figure 7:
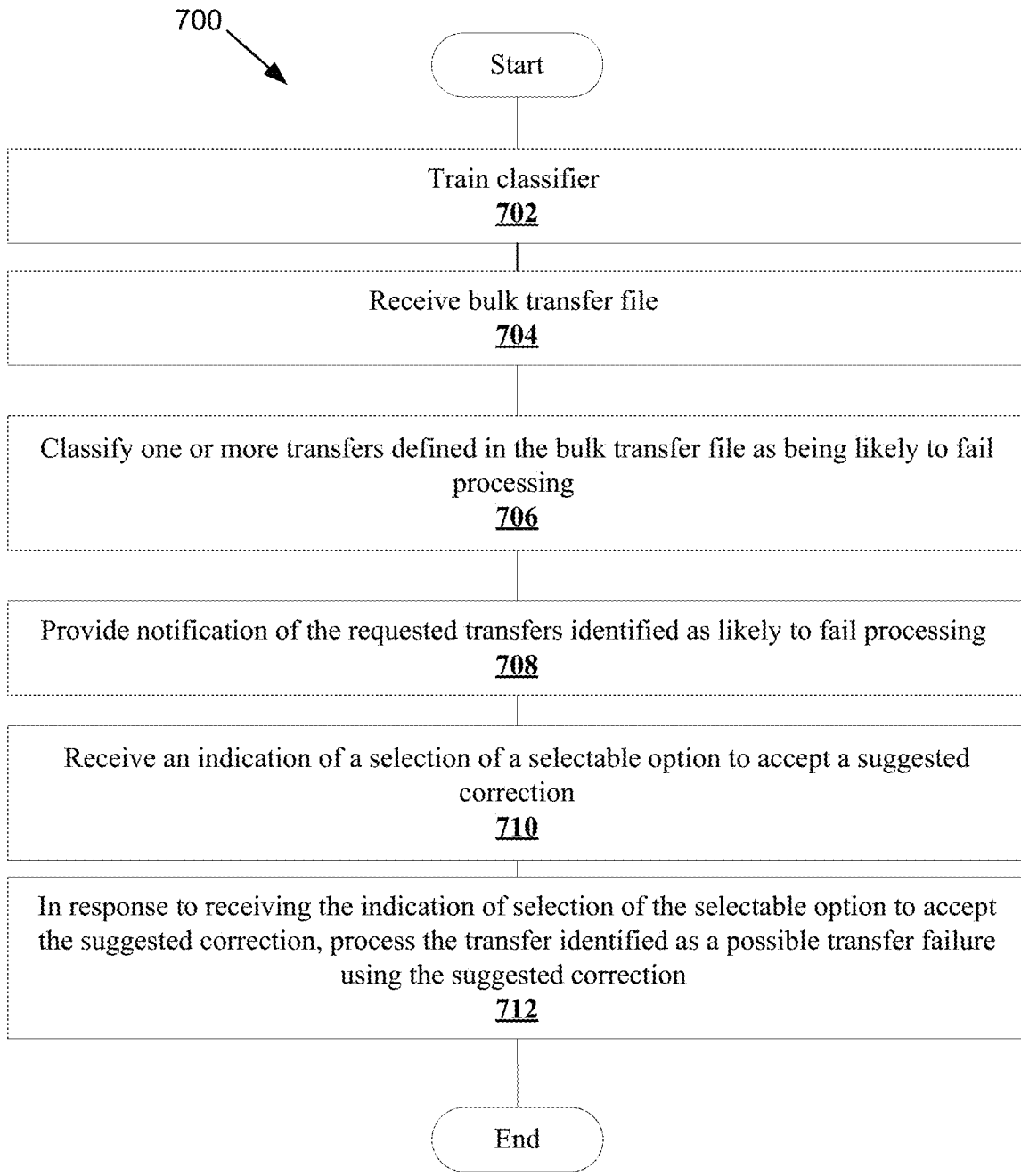
FIG. 7 is a flowchart showing operations performed in processing a bulk transfer file.

Reference will now be made to FIG. 7 which illustrates an example method 700. The method 700 may be performed by a transfer processing system 114 which may be of the type described herein. For example, the server 110 may, alone or in cooperation with other components of the transfer processing system 114, perform all or a portion of the method 700. For example, where the transfer processing system 114 is or includes an instance of the example computer system 500, the operations may be performed by the processor 510 executing instructions such as, for example, from the memory 520. Those instructions may, for example, be part of a suitable instance of the application software 610 (FIG. 6).

At the operation 702, the computer system(s) performing the method 700 may train the classifier 112. The classifier 112 may be trained to identify transfers likely to fail processing. Put differently, the classifier 112 may be trained to determine whether a given transfer is likely to fail processing or likely to pass processing. The training of the classifier is performed with training data. Training data includes a plurality of prior requested transfers and associated completion indicators indicating the prior requested transfers that failed processing. That is, the training data is a marked set of transfers. At least some of the transfers in the set of transfers are marked to indicate whether such transfers were successfully processed or whether such transfers failed processing. Such marking may include, for example, marking only the transfers that failed. That is, each transfer in the training data may be either marked with an indicator to indicate processing failure or unmarked. In such implementations, the classifier may be configured to treat unmarked transfers in the training data as having been successfully processed. In other implementations, only the transfers that were successfully processed may be marked. That is, each transfer in the training data may be either marked with an indicator to indicate processing completion or unmarked. In such implementations, the classifier may be configured to treat unmarked transfers in the training data as having failed processing. In other implementations, transfers may be marked for both processing failures and processing completion but the indictors may be different depending on whether processing completed or failed.

The classifier 112 may be configured to classify based on a number of features associated with transfers. Such features may include one or more of, for example, a recipient account number format, a recipient account number length, a recipient account number, a recipient jurisdiction and/or a recipient bank identifier. Other features may be considered instead of or in addition to the features noted above. In performing training (and later in performing classification), transfers in the training data may be processed to identify such features for each transfer. For example, where recipient account number length is considered, the classifier 112 may evaluate a particular transfer by determining the recipient account number length. The recipient account number length may then be considered an input to the classifier 112 which may be evaluated for training (or later for classification) purposes.

The transfers in the training data may, for example, represent payments. That is, the transfers may represent a transfer of value from one account to another.

In some implementations, the classifier 112 may be configured to output only an indication of whether a particular transfer is likely to pass or fail processing. The indicator may, for example, be a score or percentage. In such implementations, training the classifier may include training the classifier to output, based on an input set defined for a particular transfer, an indicator of whether the particular transfer is likely to fail processing. In some implementations, the classifier may include a recommendation module. The recommendation module may be configured to determine a suggested correction for a transfer identified as likely to fail processing. That is, the classifier 112 may be configured to not only identify transfers that are likely to fail processing, but to also identify possible corrections for such transfers.

To train the classifier 112 to determine suggested corrections, the training data may mark at least some of the past requested transfers with corrected data. The corrected data indicates a correction made to such transfers for successful processing. That is, the corrected data indicates how a transfer that was expected to fail processing in the past or that did, initially, fail such processing, was modified to later be successfully processed. By way of example, a suggested correction may indicate that a recipient jurisdiction identifier should be changed from USA to US.

After the classifier has been trained to identify transfers that are likely to fail and, in at least some implementations, to identify suggested corrections, control flow may proceed to operation 704. At operation 704, the computer system(s) performing the method 700 may receive a bulk transfer file. The bulk transfer file may be received using a communications module associated with the computer system. For example, the bulk transfer file may be received from a remote device via an upload interface displayed on the remote device. The upload interface may be an interface, such as a web interface (e.g., a web page) displayed in a web browser on the remote device, and may be provided, by the transfer processing system or another computer system(s) performing the method 700, to the remote device for display. The upload interface may, for example, be provided by the server 110 in response to a request issued from the remote device 100 to the server 110 over the network 120. For example, the upload interface may be provided in response to an HTTP GET received at the server 110 from the remote device 100.

Figure 10:
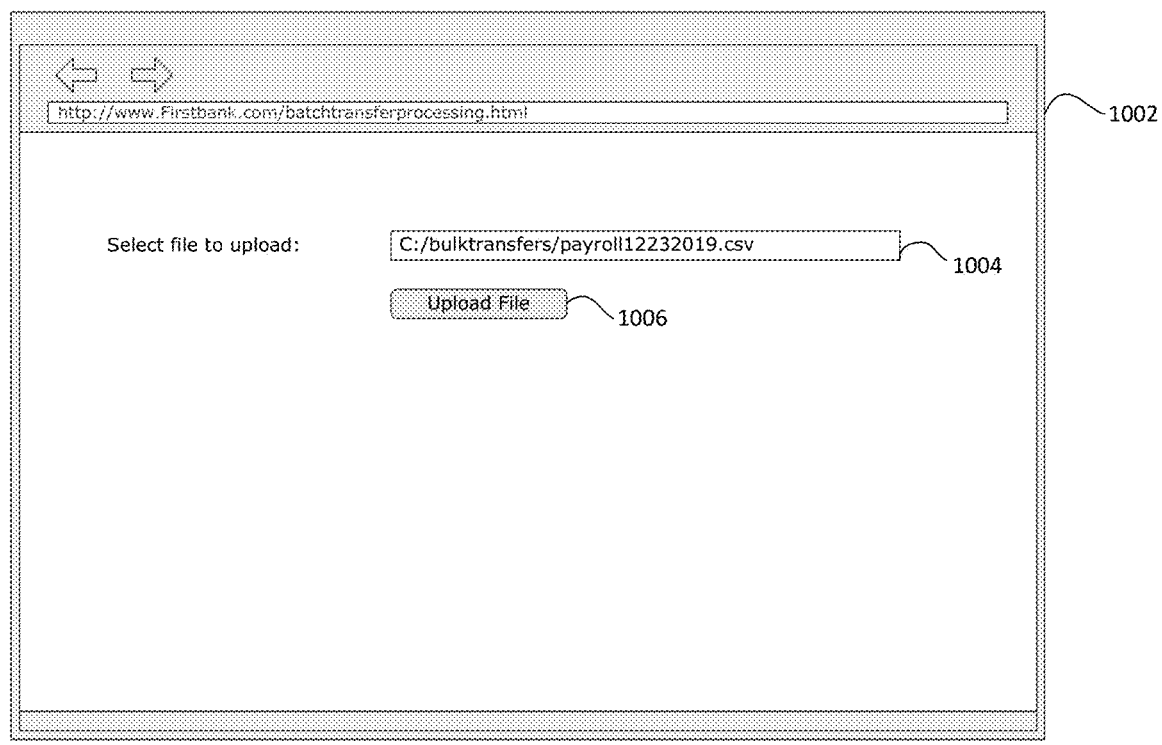
FIG. 10 is an example upload interface.

Referring briefly to FIG. 10, an example upload interface 1002 is illustrated. The upload interface 1002 may be displayed at the remote device in a web browser after an address associated with the upload interface 1002 is input into the web browser; for example, using the address bar. The upload interface includes a selectable option for uploading a bulk transfer file. For example, a file locator selectable option 1004 may be displayed and used for identifying a pointer to a local file. The pointer may include, for example, a path name and file name of the bulk transfer file. The upload interface 1002 also includes a begin upload selectable option 1006 which may be activated in order to trigger the sending of the bulk transfer file from the remote device 100 to the transfer processing system or another computer system(s) performing the method 700.

The upload interface 1002 may, in at least some embodiments, be provided to the remote device 100 after the remote device 100 has successfully authenticated itself as being associated with a particular account in a database 122 using a credential (e.g., username/password, biometric data, etc.). That is, the remote device uses a credential to confirm that it is associated with a particular account-holder, who may be referred to as an authenticated entity after successful authentication.

The bulk transfer file that is uploaded using the upload interface 1002 is, therefore, associated with a particular account. The transfers defined in the bulk transfer file represent transfers of resources from that particular account to other accounts. The other accounts may include accounts in the same database 122 (e.g., accounts at the same financial institution) and/or accounts in a different database (e.g., accounts at a different financial institution). In at least some implementations, the transfers may represent payments.

A bulk transfer file may be of the type described previously. For example, the bulk transfer file may define a plurality of requested transfers associated with a database. The database may be, for example, the database 122 associated with the transfer processing system 114 or associated with the financial institution operating the transfer processing system 114. This database 122 may maintain account balances for various bank accounts. Each transfer in the bulk transfer file is intended to define information sufficient to complete a transfer but at least some transfers may inadvertently exclude or vary necessary information. A bulk transfer file may be associated with a single transferor. For example, the bulk transfer file may include transfers that transfer resources from accounts associated with the authenticated entity.

Referring again to FIG. 7, at the operation 704 the bulk transfer file may be received at the computer system(s) performing the method 700. Then, at an operation 706, the computer system(s) performing the method 700 classifies one or more of the requested transfers defined in the bulk transfer file as being likely to fail processing by passing the requested transfers defined in the bulk transfer file to the classifier 112. That is, the classifier 112 that was trained to identify transfers likely to fail processing based on training data may now be used to classify other transfers (i.e., transfers that were not part of the training data).

In order to perform the classification, one or more features associated with each transfer may be determined and used by the classifier for the classifying. By way of example, as noted above, the features may include one or more of: a recipient account number format; a recipient account number length; a recipient account number; a recipient jurisdiction; and a recipient bank identifier.

The classifier may, as noted above, output an indicator of whether an associated transfer is likely to fail. The indicator may be, for example, a binary indicator (e.g., 1 for likely to fail or 0 for not likely to fail). In other implementations, the indicator may be a score representing a likelihood of passing or failing. The score may be evaluated by the computer system(s) performing the method 700 based on a defined threshold. For example, scores falling on one side of the threshold may be determined to represent a likelihood of failure and scores falling on the other side of the threshold may be determined to represent a likelihood of successful processing.

As noted above, in some instances, the classifier 112 may be configured to suggest corrections for transfers that are likely to fail processing. In at least some such implementations, operation 706 may include determining a suggested correction. The suggested correction may involve adding missing data or correcting erroneous data. For example, a suggested correction may be to add a missing digit to a recipient account number for a particular transfer that appears to have too few digits in an account number. By way of further example, another suggested correction may be to replace an erroneous jurisdiction identifier with a corrected jurisdiction identifier.

Next, at an operation 708, the computer system(s) performing the method 700 may provide a notification to the remote device of the requested transfers identified as likely to fail processing. The notification may be provided in real time or near real time via the communications module. For example, the notification may be provided to the remote device 100 immediately after the upload of the bulk transfer file is completed. Conveniently, in this way, the notification may be provided as an upload status indicator. The notification may be displayed on a display of the remote device 100 and the notification may appear to be displayed immediately after selection of the begin upload selectable option 1006.

Providing the notification at operation 708 may include updating the upload interface displayed on the remote device to include the notification. That is, the web interface displayed on the remote device may be uploaded to include the notification.

Figure 11:
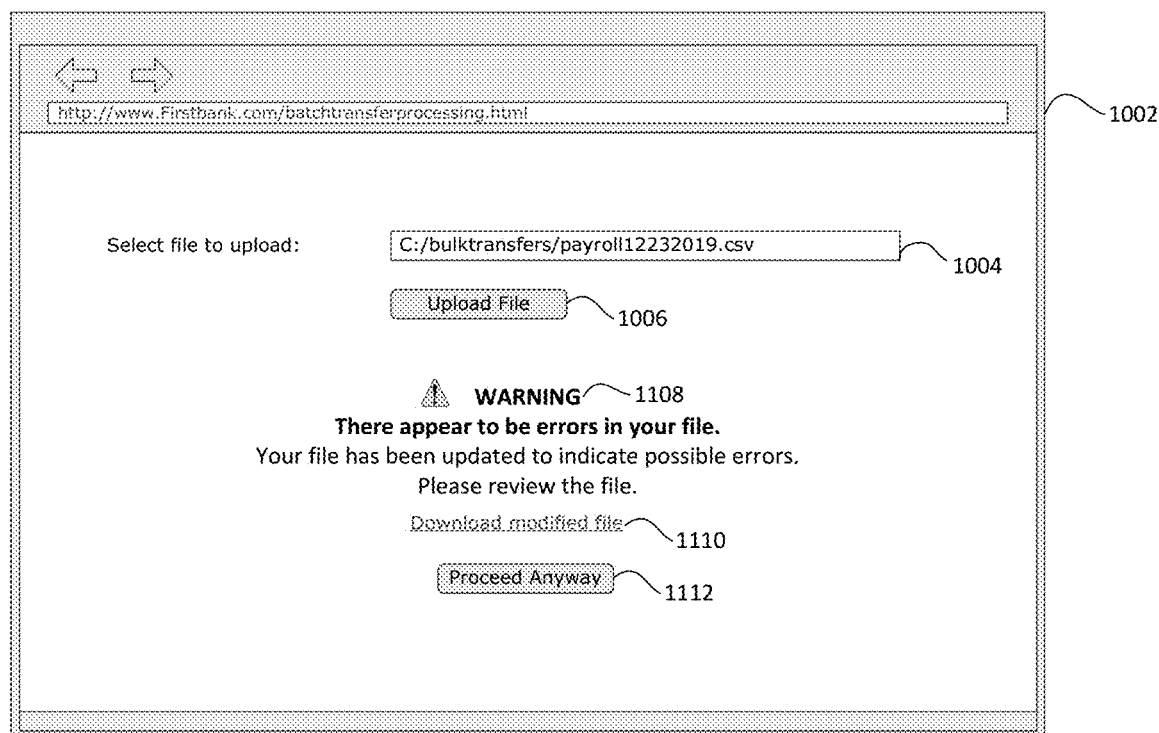
FIG. 11 is an example upload interface having a notification.

Referring briefly to FIG. 11, an example notification 1108 is illustrated. The example notification 1108 may be displayed at a location of a display that would, if all transfers in the bulk transfer file were determined to be likely to be successfully processed, instead display an indication of completion of an upload. By way of example, if all transfers in the bulk transfer file were determined to be likely to be processed successfully, the computer system(s) performing the method 700 may, instead, provide a notification that the upload was completed successfully and the notification of upload completion could be displayed in place of the notification that one or more of the requested transfers are likely to fail processing.

The notification is, in the example, provided in a web interface. For example, the notification may be provided in the upload interface 1002.

The notification may identify the transfer(s) that is/are likely to fail processing so that such transfers may be distinguished from others of the transfers (i.e., from the transfers that are likely to be successfully processed). For example, the transfer(s) that is/are likely to fail processing may be highlighted. In the example of FIG. 11, the transfers that are likely to fail may be highlighted by providing, through the upload interface, access to a modified bulk transfer file. In the example of FIG. 11, access to the modified bulk transfer file is provided through a download link 1110. Activation of the download link may cause a request to be issued from the remote device to the computer system(s) performing the method 700 to request the modified bulk transfer file. The modified bulk transfer file may, in at least some such embodiments, be prepared prior to the notification being provided at operation 708 and may be stored in memory associated with the computer system(s) performing the method 700 so that the modified bulk transfer file may be retrieved when the download link 1110 is activated. The modified bulk transfer file may be an updated version of the bulk transfer file. The modified bulk transfer file is modified to include an indication of which of the transfers are likely to fail processing. The indication may be provided in various ways. In one example, the indication may be provided by including highlighting to distinguish transfers that are likely to be processed successfully from transfers that are likely to fail processing. Highlighting may include highlighting only the transfers that are likely to be processed successfully or highlighting only the transfers that are likely to fail processing. In some implementations, both the transfers that are likely to be successfully processed and the transfers that are likely to fail may be highlighted, but using different highlighting techniques. For example, green highlighting may be used for transfers that are likely to be successfully processed and red highlighting may be used for transfers that are likely to fail processing.

As used herein, highlighting may include any visual modification intended to distinguish from non-highlighted portions. For example, highlighting may include any one or more of: changing a displayed font, changing a background colour or pattern, changing a foreground colour or pattern, using a bold effect, using an underline effect, using an italics effect, etc.

The modified bulk transfer file may, in some implementations, include all transfers in the uploaded bulk transfer file. In at least some such implementations, the computer system(s) performing the method 700 may, upon determining that certain of the requested transfers are likely to fail processing, cease processing any transfers in the bulk transfer file until feedback is received from the remote device indicating how the transfers that are likely to fail processing are to be handled. In other implementations, the computer system(s) performing the method 700 may, upon determining that certain of the requested transfers are likely to fail processing, process others of the transfers and cease processing only the transfers that are determined to be likely to fail processing until feedback on such transfers is received. In at least some such implementations, the modified bulk transfer file may include a filtered listing of transfers. The filtered listing of transfers may include only the transfers determined to be likely to fail processing.

In some instances, the modified bulk transfer file may include one or more additional rows or columns that were not included in the uploaded bulk transfer file. For example, a new column (or row as the case may be) may be added to indicate whether a transfer associated with a particular row (or column as the case may be) is likely to pass and/or likely to fail processing.

The notification may, in at least some implementations, include a determined suggested correction. As noted previously, the classifier may determine a suggested correction for a transfer and the suggested correction may be provided in the notification. In the example of FIG. 11, the suggested correction may be provided in the modified bulk transfer file. For example, the modified bulk transfer file may be modified to, in some way, indicate the particular data that appears to be causing a problem. In at least some implementations, a new column (or row as the case may be) may be added to indicate the suggested correction. For example, the new column may indicate, for a particular transfer: "The recipient jurisdiction should be US and not USD".

The displayed interface may include various interface elements for providing a reply to the notification. For example, the displayed interface may include one or more of: a selectable option to proceed with only the transfers that were identified as being likely to be successfully processed, a selectable option to provide an indication that a transfer identified as likely to fail processing is believed to be correct, a selectable option to proceed with processing of all transfers even though some may fail, a selectable option to modify (i.e., to correct) one or more of the transfers and/or a selectable option of another type. The computer system(s) performing the method 700 may, upon receiving a reply via such a selectable option, continue processing of the transfers in accordance with the reply. For example, if the reply indicated that processing of all transfers is to continue, then the computer system(s) performing the method 700 will proceed to process (i.e., attempt to complete) all such transfers.

In the example of FIG. 11, the displayed interface includes a selectable option 1112 to indicate that a transfer identified as likely to fail processing is believed to be correct.

FIG. 12 illustrates another implementation of the upload interface that includes an alternate notification 1108. The alternate notification provides particulars of the notification directly on the displayed upload interface rather that by way of the link 1110. For example, a plurality of transfers may be displayed in a transfer listing 1212. The transfer listing may include only the transfers that are determined to be likely to fail processing or it may include all transfers but, in some way, highlight the transfers that are determined to be likely to fail. Highlighting may include any of the highlighting techniques described previously. Highlighting the transfers that are determined to be likely to fail may be accomplished by highlighting the transfers that are determined to be likely to be successfully processed (which, in effect, highlights the transfers that are not likely to be successful).

In the example of FIG. 12, the displayed transfers include a column indicating a possible cause of failure. In the example of FIG. 12, the displayed transfers are modifiable. For example, a particular cell of the table may be selected and the contents modified. The example of FIG. 12 also includes a selectable option 1214 for sending, to the computer system(s) performing the method 700, updated transfer data for at least some of the transfers. For example, selection of the selectable option may cause any modified transfers to be sent to the computer system(s) performing the method 700. The computer system(s) performing the method 700 may then continue processing these modified transfers or may, instead, resume processing at operation 704 where classification may be performed based on the updated transfer data.

The nature of subsequent operations performed by the computer system(s) vary based on the nature of the reply received from the remote device. For example, in some implementations, the upload interface may include a selectable option to accept a suggested correction (e.g., a suggested correction included in the notification). Accordingly, referring again to FIG. 7, in some implementations, the computer system(s) performing the method 700 may, at an operation 710, receive, via the communications module, an indication of a selection of a selectable option to accept a suggested correction. In response to receiving the indication of selection of the selectable option, the computer system(s) performing the method 700 may process the transfer identified as a possible transfer failure using the suggested correction. For example, if the suggested correction includes replacing USD with US, then the transfer may be processed taking this correction into account. In at least some implementations, processing the transfer identified as a possible transfer failure using the suggested correction may include updating the bulk transfer file based on the suggested correction. Then, after such updating, all transfers in the (updated) bulk transfer file may be processed.

Figure 8:
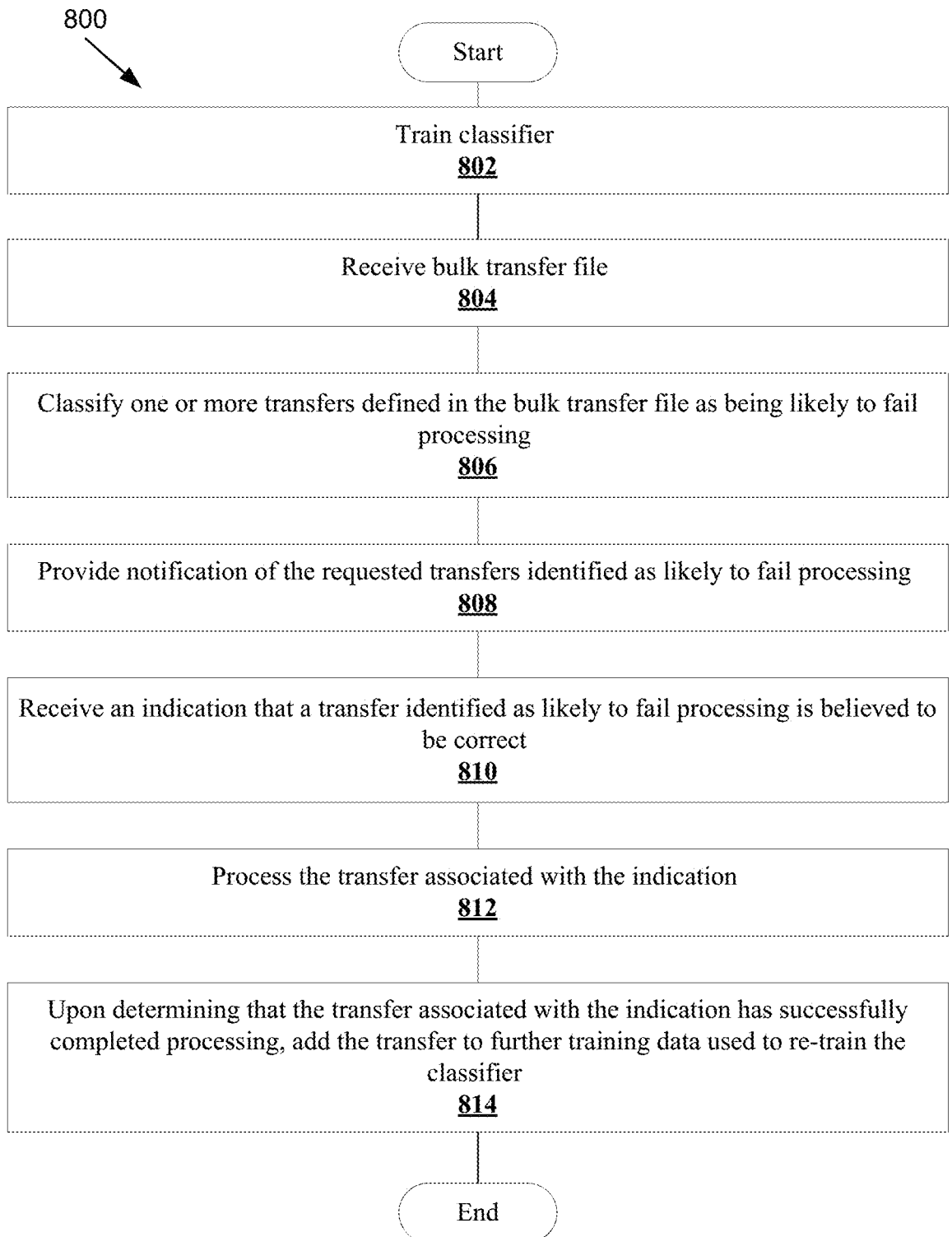
FIG. 8 is a flowchart showing operations performed in processing a bulk transfer file.

The method 700 is capable of variation. An example of possible variations on the method 700 is illustrated in FIG. 8, which illustrates a method 800. The method 800 may be performed by a transfer processing system 114 which may be of the type described herein. For example, the server 110 may, alone or in cooperation with other components of the transfer processing system 114, perform all or a portion of the method 800. For example, where the transfer processing system 114 is or includes an instance of the example computer system 500, the operations may be performed by the processor 510 executing instructions such as, for example, from the memory 520. Those instructions may, for example, be part of a suitable instance of the application software 610 (FIG. 6).

The method 800 of FIG. 8 includes a number of operations in common with the method 700 of FIG. 7. For example, operations 802, 804, 806 and 808 of the method 800 of FIG. 8 may be the same as operations 702, 704, 706 and 708 respectively of the method 700 of FIG. 7. The method 800 includes, at operation 810, receiving an indication from the remote device and via the communications module that a transfer identified as likely to fail processing is believed to be correct. The indication may be received when a selectable option, such as the selectable option 1112 of FIG. 11 is selected. That is, a selectable option to indicate that one or more transfers identified as likely to fail processing is/are believed to be correct may be provided on the upload interface 1002 and may be activated to trigger the sending of the indication that the transfer is believed to be correct.

At operation 812, the method 800 includes processing the transfer(s) associated with the indication. That is, the computer system(s) performing the method 800 may, upon receiving the indication at operation 810, process the associated transfer(s) at operation 812. In the upload interface 1002 of FIG. 12, the selectable option to indicate that one or more transfers identified as likely to fail processing is/are believed to be correct is a selectable option to request the computer system(s) performing the method 800 to proceed with processing of all transfers that were flagged as being likely to fail. In such an implementation, operation 812 may include processing all transfers identified as being likely to fail. Further, as noted above, in some instances, when certain transfers in a bulk transfer file are identified as being likely to fail, processing of all transfers (including those likely to complete processing) is ceased to await for feedback. In at least some such implementations, when the selectable option is selected, processing of all transfers in the bulk transfer file may be performed.

When the classifier is overridden by user input (i.e., when the selectable option to indicate that one or more transfers identified as likely to fail processing is/are believed to be correct is selected), it may be that either: 1) the user input was wrong and the transfer flagged as being likely to fail does, in fact, fail; or 2) the classifier misclassified the transfer. Accordingly, when input is received indicating that the selectable option to indicate that one or more transfers identified as likely to fail processing is/are believed to be correct has been selected, the computer system(s) performing the method 800 may then monitor to see whether the classifier misclassified the transfer. At operation 814, upon determining that the transfer associated with the indication has successfully completed processing, computer system(s) performing the method may add the transfer to further training data used to re-train the classifier. For example, the further training data may indicate that the transfer has completed processing. In some implementations, the further training data may include only erroneously classified transfers. That is, the further training data may include only transfers that were misclassified by the classifier.

The classifier may then be re-trained based on the further training data.

Accordingly, the method 800 may be used to retrain the classifier when a transfer identified as being likely to fail is successfully processed. Additionally or alternatively, the method 800 may be modified to retrain the classifier when a transfer identified by the classifier as being likely to pass processing instead fails processing. For example, when a transfer identified as being likely to pass fails processing, that transfer may be added to the further training data that is used to re-train the classifier.

The method 800 of FIG. 8 may also be modified to include operations of the method 700 of FIG. 7 not illustrated in FIG. 8 including, for example, the operations 710 and 712.

Figure 9:
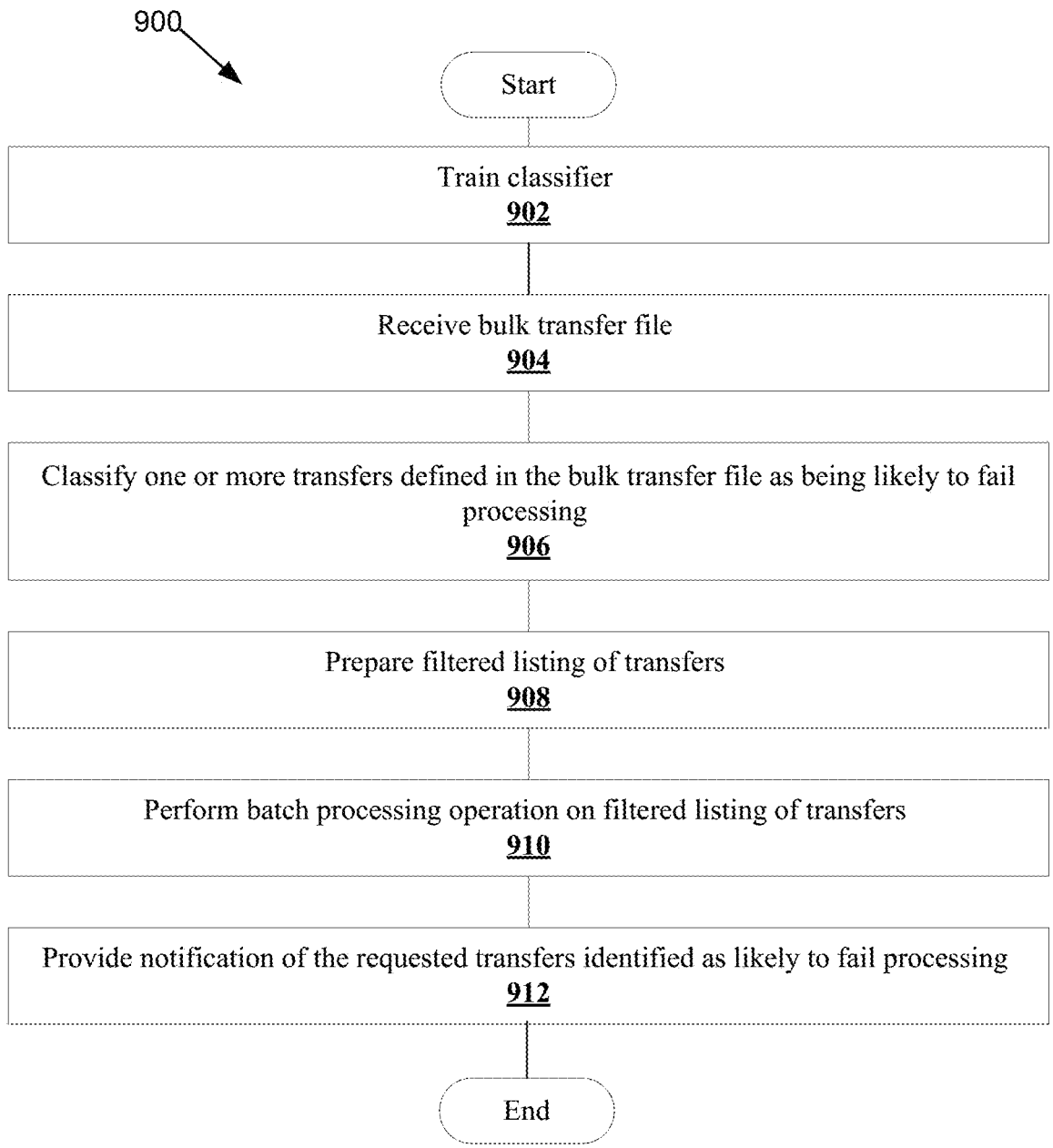
FIG. 9 is a flowchart showing operations performed in processing a bulk transfer file.

A further example of a further variation on the methods 700 and 800 is illustrated in FIG. 9, which illustrates a method 900. The method 900 may be performed by a transfer processing system 114 which may be of the type described herein. For example, the server 110 may, alone or in cooperation with other components of the transfer processing system 114, perform all or a portion of the method 900. For example, where the transfer processing system 114 is or includes an instance of the example computer system 500, the operations may be performed by the processor 510 executing instructions such as, for example, from the memory 520. Those instructions may, for example, be part of a suitable instance of the application software 610 (FIG. 6).

The method 900 of FIG. 8 includes a number of operations in common with the method 700 of FIG. 7. For example, operations 902, 904, and 906 of the method 900 of FIG. 9 may be the same as operations 702, 704, and 706 respectively of the method 700 of FIG. 7. The method 900 includes, at operation 908, after classifying, preparing a filtered listing of transfers. The filtered listing of transfers includes the plurality of requested transfers not identified as likely to fail processing and excludes any of the plurality of requested transfers identified as likely to fail processing. That is, the computer system(s) performing the method 900 may filter out the transfer likely to fail so that the filtered listing of transfers includes only the transfers that are likely to complete. Then, at operation 910, the computer system(s) performing the method 800 may perform a batch processing operation on the filtered listing of transfers to complete the transfers identified in the filtered listing of transfers. That is, the "good" transfers (i.e., those identified as likely to complete) may be immediately sent for processing. A notification may be provided at operation 912 in the manner described above with reference to operation 708 of the method 700 of FIG. 7. While not illustrated in FIG. 9, the "bad" transfers (i.e., those identified as likely to fail) may be processed later, after the notification is sent and a reply is received from the remote device. As mentioned previously, the nature of the subsequent processing may vary based on the nature of the reply. For example, where the reply indicates that one or more of the "bad" transfers is/are believed to be correct, such transfers may be processed as described above with reference to the operation 812 of the method 800 of FIG. 8. Where the reply modifies the transfer (e.g., by making a correction to certain information defining the transfer), the transfer may be processed in its modified form.

Conveniently, the method 900 of FIG. 9 allows processing of the "good" transfers to occur immediately such that correction of the "bad" transfers does not delay processing of the "good" transfers.

Other variations of the methods 700, 800 and/or 900 described herein are possible. For example, in at least some implementations, the computer system(s) performing the method 700, 800, 900 may be configured to issue a timeout if a notification is not replied to expediently or if a user navigates away from the upload interface displaying the notification without addressing the notification or if another suitable trigger condition occurs. When the timeout occurs, the computer system(s) performing the method may automatically resume processing of the transfer(s) identified as being likely to fail. That is, the computer system(s) performing the method 800 may, if no action is taken in response to the notification, attempt to complete processing of all transfers in the bulk transfer file.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A transfer processing system comprising:
a communications module;
a processor coupled to the communications module; and
a memory coupled to the processor and storing instructions that, when executed by the processor, cause the transfer processing system to:
receive, using the communications module and from a remote device via an upload interface displayed on the remote device, a bulk transfer file, the bulk transfer file defining a plurality of requested transfers associated with a database;
classify one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing;

after classifying, prepare a filtered listing of transfers, the filtered listing of transfers including the plurality of requested transfers not identified as likely to fail processing and excluding any of the plurality of requested transfers identified as likely to fail processing;

perform a batch processing operation on the filtered listing of transfers to complete the transfers identified in the filtered listing of transfers;

provide, in real time or near real time upon completion of the upload of the bulk transfer file via the communications module, a notification to the remote device including a modified bulk transfer file including the plurality of requested transfers defined in the bulk transfer file identified as likely to fail processing and excluding the transfers identified in the filtered listing of transfers;

receive an indication from the remote device and via the communications module that a transfer identified as likely to fail processing is believed to be correct;

process the transfer associated with the indication; and upon determining that the transfer associated with the indication has successfully completed processing, add the transfer to further training data used to re-train the classifier, the further training data indicating that the transfer has completed processing, the further training data including only erroneously classified transfers.

2. The transfer processing system of claim 1, wherein the instructions further cause the transfer processing system to:
train the classifier to identify transfers likely to fail processing using the training data.

3. The transfer processing system of claim 1, wherein the classifier is configured to classify based on one or more of the following features:
recipient account number format;
recipient account number length;
recipient account number;
recipient jurisdiction; and
recipient bank identifier.

4. The transfer processing system of claim 1, wherein the transfers represent payments.

5. The transfer processing system of claim 1, wherein the training data marks at least some of the past requested transfers with corrected data, the corrected data indicating a correction made to such transfers for successful processing and wherein the classifier is trained to determine a suggested correction for a transfer identified as likely to fail processing, and wherein the notification includes the determined suggested correction.

6. The transfer processing system of claim 5, wherein the notification includes a selectable option to accept the suggested correction and wherein the instructions further cause the transfer processing system to:
receive an indication of a selection of the selectable option via the communications module; and
in response to receiving the indication of selection of the selectable option, process the transfer identified as a possible transfer failure using the suggested correction.

7. The transfer processing system of claim 6, wherein processing the transfer identified as a possible transfer failure using the suggested correction includes updating the bulk transfer file based on the suggested correction.

8. The transfer processing system of claim 1, wherein the notification includes an indication of which of the plurality of requested transfers are likely to fail processing.

9. The transfer processing system of claim 8, wherein the indication includes a score.

10. The transfer processing system of claim 1, wherein the filtered listing of transfers is sent for processing immediately after classifying and wherein the plurality of requested transfers identified as likely to fail processing are processed after the notification is sent and a reply is received from the remote device.

11. A computer-implemented method comprising:
receiving a bulk transfer file from a remote device, the bulk transfer file defining a plurality of requested transfers associated with a database;
classifying one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing;
after classifying, preparing a filtered listing of transfers, the filtered listing of transfers including the plurality of requested transfers not identified as likely to fail processing and excluding any of the plurality of requested transfers identified as likely to fail processing;
performing a batch processing operation on the filtered listing of transfers to complete the transfers identified in the filtered listing of transfers;
providing, in real time or near real time upon completion of the upload of the bulk transfer file, a notification to the remote device including a modified bulk transfer file including the plurality of requested transfers defined in the bulk transfer file identified as likely to fail processing and excluding the transfers identified in the filtered listing of transfers;
receive an indication from the remote device and via the communications module that a transfer identified as likely to fail processing is believed to be correct;
process the transfer associated with the indication; and
upon determining that the transfer associated with the indication has successfully completed processing, add the transfer to further training data used to re-train the classifier, the further training data indicating that the transfer has completed processing, the further training data including only erroneously classified transfers.

12. The computer-implemented method of claim 11, further comprising:
training the classifier to identify transfers likely to fail processing using the training data.

13. The computer-implemented method of claim 11, wherein the classifier is configured to classify based on one or more of the following features:
recipient account number format;
recipient account number length;
recipient account number;
recipient jurisdiction; and
recipient bank identifier.

14. The computer-implemented method of claim 11, wherein the transfers represent payments.

15. The computer-implemented method of claim 11, wherein the training data marks at least some of the past requested transfers with corrected data, the corrected data indicating a correction made to such transfers for successful processing and wherein the classifier is trained to determine a suggested correction for a transfer identified as likely to fail processing, and wherein the notification includes the determined suggested correction.

16. The computer-implemented method of claim 15, wherein the notification includes a selectable option to accept the suggested correction and wherein the method further includes:
   receiving an indication of a selection of the selectable option; and
   in response to receiving the indication of selection of the selectable option, processing the transfer identified as a possible transfer failure using the suggested correction.

17. The computer-implemented method of claim 16, wherein processing the transfer identified as a possible transfer failure using the suggested correction includes updating the bulk transfer file based on the suggested correction.

18. The computer-implemented method of claim 11, wherein the bulk transfer file is received via an upload interface and wherein the upload interface is provided in a web interface and wherein the notification is provided in the web interface.

19. A non-transitory computer-readable storage medium storing instructions which, when executed by a processor of a computer system, cause the computer system to:
   receive a bulk transfer file from a remote device, the bulk transfer file defining a plurality of requested transfers associated with a database;
   classify one or more of the requested transfers defined in the bulk transfer file as being likely to fail processing by passing the requested transfers defined in the bulk transfer file to a classifier trained to identify transfers likely to fail processing based on training data, the training data including a plurality of prior requested transfers and associated completion indicators indicating the prior requested transfers that failed processing;
   after classifying, prepare a filtered listing of transfers, the filtered listing of transfers including the plurality of requested transfers not identified as likely to fail processing and excluding any of the plurality of requested transfers identified as likely to fail processing;
   perform a batch processing operation on the filtered listing of transfers to complete the transfers identified in the filtered listing of transfers;
   provide, in real time or near real time upon completion of the upload of the bulk transfer file via the communications module, a notification to the remote device including a modified bulk transfer file including the plurality of requested transfers defined in the bulk transfer file identified as likely to fail processing and excluding the transfers identified in the filtered listing of transfers;
   receive an indication from the remote device and via the communications module that a transfer identified as likely to fail processing is believed to be correct;
   process the transfer associated with the indication; and
   upon determining that the transfer associated with the indication has successfully completed processing, add the transfer to further training data used to re-train the classifier, the further training data indicating that the transfer has completed processing, the further training data including only erroneously classified transfers.

* * * * *